UNITED STATES PATENT OFFICE.

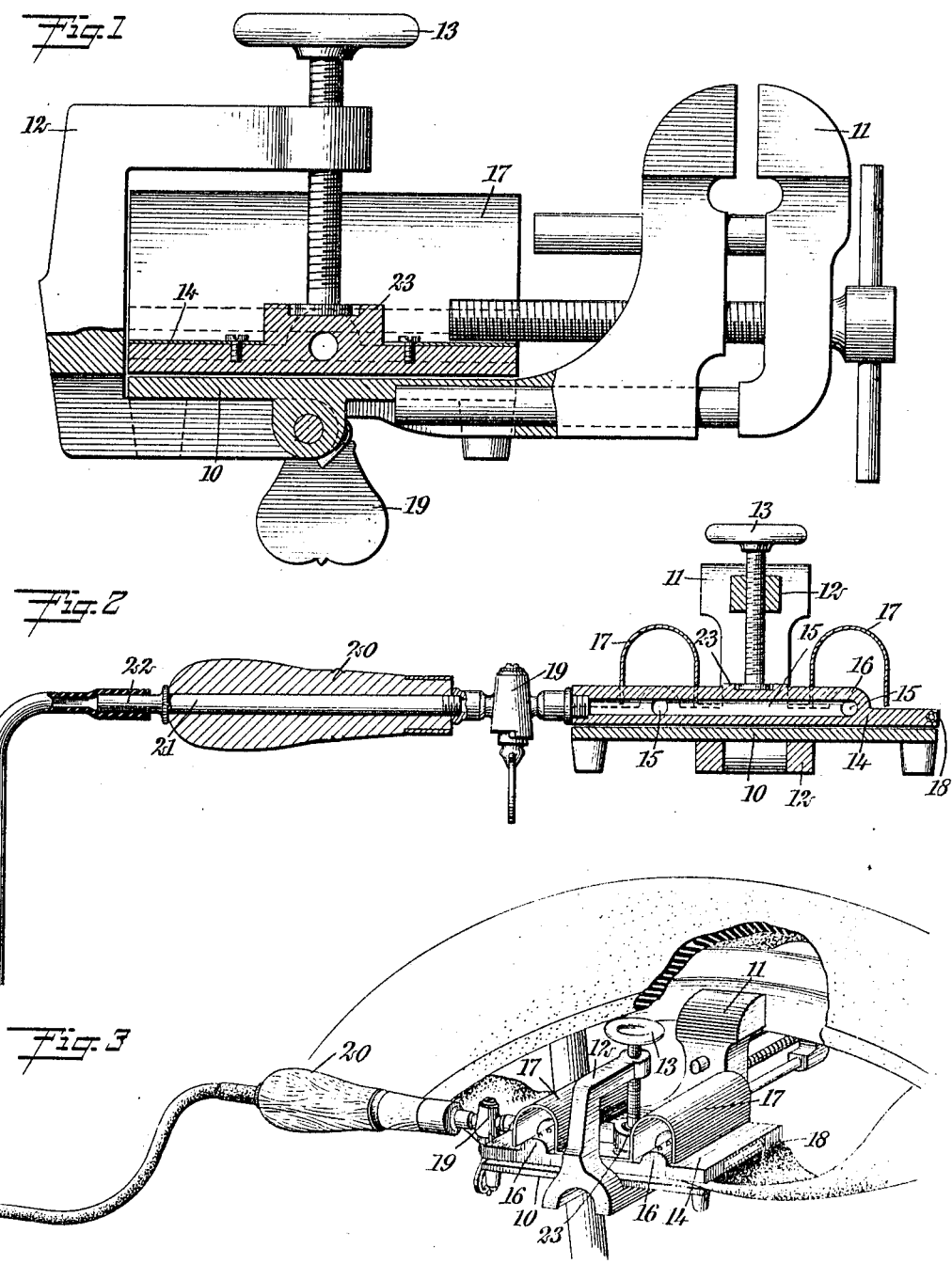

WINFIELD L. DINSMOOR, OF LONGBEACH, CALIFORNIA, ASSIGNOR TO ECONOMY TOOL COMPANY OF LOS ANGELES, CALIFORNIA.

ATTACHMENT FOR REPAIR-TOOLS.

954,424.  Specification of Letters Patent.  Patented Apr. 12, 1910.

Application filed October 24, 1908. Serial No. 459,335.

*To all whom it may concern:*

Be it known that I, WINFIELD L. DINSMOOR, a citizen of the United States, and a resident of Longbeach, in the county of Los Angeles and State of California, have invented a new and Improved Attachment for Repair-Tools, of which the following is a full, clear, and exact description.

The invention is an attachment for repair tools, more especially a tool of the nature disclosed in Patent No. 877,306, granted to me January 21, 1908, and is designed to provide a heating plate for vulcanizing purposes, interchangeable with the upper or movable clamping plate on the said tool.

To this end the heating plate is preferably cast with an inner chamber or passages and has one or more burners on its outer face communicating with said passages, shields over the burners for reflecting the heat to the plate, and a lug or seat for the reception of the clamping screw which operates to force the two jaws or clamping plates together. In automobile repair work the gas for the burner is let into the supply passages ordinarily through the burner handle, and if the repair is made on the road, the supply of gas is had from the acetylene generator.

Reference is to be had to the accompanying drawings forming a part of this specification, in which similar characters of reference indicate corresponding parts in all the views.

Figure 1 illustrates in cross-section, my improved attachment as applied to my patented repair tool; Fig. 2 is a section through the same at right-angles to the section in Fig. 1; and Fig. 3 is a perspective view illustrating the mode of use of my improvements.

In order that a full understanding of the manner in which my improved repair tool attachment is used, I have shown it in connection with the repair tool above referred to, the same consisting of a clamping member or plate 10 having a vise 11 at one side, a yoke 12 at the opposite side, hinged to the under side of the plate 10, and a clamping screw 13, which ordinarily carries a clamping member or plate (not shown), coacting with the plate 10. The screw-operated plate is interchangeable with my improved attachment, which is also in the nature of a plate 14, of like extent, having a chamber or passages 15. The passages communicate with burners 16 arranged on the outer face of the plate and in the nature of perforated ribs which are transversely arranged each side of the center of the plate and covered by shields 17 which serve to reflect the heat inwardly. One end of the plate has a thermometer 18 let into its edge, and at the opposite end a cock or valve 19, in communication with a tubular handle 20, connects with the chamber or passages leading to the burners. The connection between the cock 19 and the tubular handle is effected by providing the bore of the handle with a tube 21 which is extended beyond the outer end of the handle in the form of a nipple 22 for the connection of a rubber tube or other similar device in piping the gas to the burners, this gas ordinarily being supplied from the acetylene generator for the automobile lamps, especially when the repair is made on the road where city gas is not obtainable. The outer face of the plate 14 is provided at its center with a seat for the inner end of the clamping screw 13, which, in order to insure a sufficient thickness of metal over the longitudinal passage 15, is in the nature of a lug 23 having a central recess.

In vulcanizing a patch to the inner tube of a tire without entirely removing it from the vehicle wheel, the repair tool is applied as illustrated in Fig. 3, the usual upper clamping plate being supplanted with my improved heating plate. After the attachment has been connected with the gas supply the valve 19 is turned on and the burners lighted. When the temperature of the plate rises to the required point as indicated on the thermometer 18 (ordinarily 275° Fah. for vulcanizing), the patch is pressed firmly to the tire by the plate upon operating the screw 13.

Although I have shown my attachment in connection with a particular form of repair tool, it is evident that it may be advantageously used as one of the clamping plates or members of any clamp.

Having thus described my invention, I claim as new and desire to secure by Letters Patent:

1. A portable vulcanizing tool comprising a plate having a vulcanizing face at one side and a face at the opposite side accessible for clamping the plate to the part to be vulcanized, said plate provided with a gas or vapor burner arranged to heat the vulcanizing face, and a handle extending outwardly from the edge of the plate between the two faces, having a gas supply passage leading to the burner.

2. The combination of a clamping plate, a second clamping plate coacting therewith, having a burner on its outer face and provided with a gas supply passage leading to the burner, and a shield over the burner, arranged to reflect the heat downwardly on the plate.

3. The combination of a clamping plate, a vulcanizing clamping plate having burners and provided with a passage therein leading to said burners, shields arranged over the burners to reflect the heat downwardly on the plate, and means to force the plates together.

4. In a repair tool, a clamping-plate having means to detachably secure it to the rim of a vehicle wheel and extend to one side thereof, a vulcanizing clamping-plate having a burner, and means carried by the first mentioned clamping-plate to force the vulcanizing clamping-plate thereto.

5. In a repair tool, a clamping plate having means to detachably secure it to and support it on a vehicle wheel and provided with a clamping screw, and a vulcanizing clamping plate removable at will between the screw and the first mentioned clamping plate and having a heating burner.

6. In a repair tool, a clamping-plate having means to detachably secure it to a vehicle wheel and provided with a clamping-screw, and a vulcanizing clamping-plate removable at will between the screw and the first mentioned clamping-plate and having a heating burner.

In testimony whereof I have signed my name to this specification in the presence of two subscribing witnesses.

WINFIELD L. DINSMOOR.

Witnesses:
A. CRAIG,
F. W. STEVENS.